United States Patent
Dhanakshirur et al.

(10) Patent No.: US 12,470,464 B2
(45) Date of Patent: Nov. 11, 2025

(54) CLOUD TOPOLOGY OPTIMIZATION USING A GRAPH CONVOLUTIONAL NETWORK MODEL

(71) Applicant: INTERNATIONAL BUSINESS MACHINES CORPORATION, Armonk, NY (US)

(72) Inventors: Girish Dhanakshirur, Bangalore (IN); Hemant Kumar Sivaswamy, Bangalore (IN); Vidya Chandrashekar, Bangalore (IN); Rachana Vishwanathula, Hyderabad (IN); Deepak Rai, Mangalore (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/619,928

(22) Filed: Mar. 28, 2024

(65) Prior Publication Data

US 2025/0310204 A1    Oct. 2, 2025

(51) Int. Cl.
*H04L 41/12* (2022.01)
*H04L 41/16* (2022.01)
*H04L 41/5009* (2022.01)

(52) U.S. Cl.
CPC ............ *H04L 41/12* (2013.01); *H04L 41/16* (2013.01); *H04L 41/5009* (2013.01)

(58) Field of Classification Search
CPC ....... H04L 41/12; H04L 41/122; H04L 41/14; H04L 41/142; H04L 41/145; H04L 41/16; H04L 41/5009
See application file for complete search history.

(56) References Cited

U.S. PATENT DOCUMENTS

| 10,379,910 B2 | 8/2019 | Balasubramanian |
| 2020/0337648 A1* | 10/2020 | Saripalli ................. G06N 20/00 |

(Continued)

FOREIGN PATENT DOCUMENTS

| CN | 110138595 A | * | 8/2019 | |
| CN | 110263280 A | * | 9/2019 | ........... G06F 16/958 |

(Continued)

OTHER PUBLICATIONS

Ning-Yu Kao, "Introduction of Graph Convolutional Network (GCN) & Quick Implementation," May 18, 2022. (Year: 2022).*

(Continued)

*Primary Examiner* — Alina A Boutah
(74) *Attorney, Agent, or Firm* — CHIP LAW GROUP

(57) ABSTRACT

A method, computer program product, and computer system for network topology optimization. A graph convolutional network (GCN) model is trained using training network topology datasets as input. Each training network topology dataset includes: (i) a specified network topology and an associated optimal network topology and an optimality function value for the optimal network topology, (ii) relative weights of optimality parameters including performance, availability, and scalability, and (iii) an identification of an optimality function of the optimality parameters weighted by the relative weights. The specified network topology includes components, relationships between the components, and metadata pertaining to the components. Each output node in an output layer of the GCN model includes an optimality function value for a different candidate network topology. One of the output nodes identifies an optimum network topology relative to the specified network topology as being the candidate network topology having a highest optimality function value.

20 Claims, 14 Drawing Sheets

GCN Model With Hidden Layer Structure

(56) References Cited

U.S. PATENT DOCUMENTS

2022/0358240 A1* 11/2022 Neal .................. G06F 21/6245
2025/0021395 A1* 1/2025 Kelly ................. G06Q 30/0283

FOREIGN PATENT DOCUMENTS

| CN | 112422299 | A | | 2/2021 | |
|----|-----------|---|---|--------|---|
| CN | 113541986 | A | * | 10/2021 | |
| CN | 113825151 | A | * | 12/2021 | |
| CN | 112422299 | B | | 10/2022 | |
| CN | 113904786 | B | * | 5/2023 | |
| CN | 116192662 | A | * | 5/2023 | |
| CN | 116192669 | A | * | 5/2023 | ........... H04L 41/147 |
| CN | 117459112 | A | * | 1/2024 | |
| CN | 117834508 | A | * | 4/2024 | |
| CN | 117857375 | A | * | 4/2024 | |
| CN | 119449710 | A | * | 2/2025 | |
| CN | 119496716 | A | * | 2/2025 | |

OTHER PUBLICATIONS

Changran Liu, "How to train graph convolutional network models in a graph database," Machine Learning, Oct. 1, 2020. (Year: 2020).*

Zhang et al., "Graph convolutional networks: a comprehensive review," Zhang et al. Comput Soc Netw (2019) 6:11 https://doi.org/10.1186/s40649-019-0069-y, Computational Social Networks, University of Illinois Urbana-Champaign, Champaign, USA. (Year: 2019).*

Xusheng AI, A Tiered Recommender System for Cost-Effective Cloud Instance Selection, Published Date: 2021, University of the Pacific, Scholarly Commons, 71 pages.

Kornevs et al., Cloud Computing Evaluation Based on Financial Metrics, Article in Information Technology and Management Science, Dec. 2012, ResearchGate, DOI:10.2478/v10313-012-0013-8, 7 pages.

Authors: Disclosed Anonymously, Designing for Cloud, Published Date: Apr. 19, 2023, IP.com No. IPCOM000272131D, 6 pages.

Yao et al., Invoice Detection and Recognition System Based on Deep Learning, Wiley/Hindawi, vol. 2022, Article ID 8032726, 10 pages, https://doi.org/10.1155/2022/8032726, Published Date: Jan. 25, 2022.

Maximizing Efficiency: AI-Powered Strategies to Reduce Cloud Spending, Published Date: Oct. 10, 2023, Retrieved from Internet on Dec. 5, 2023: https://www.linkedin.com/pulse/maximizing-efficiency-ai-powered-strategies-reduce-cloud-cavallino/, 5 pages.

Trey Huffine, How we reduced our annual server costs by 80%—from $1M to $200k—by moving away from AWS, Sep. 26, 2022, 18 pages.

Aslam et al., Information collection centric techniques for cloud resource management: Taxonomy, analysis and challenges, Journal of Network and Computer Applications, vol. 100, Dec. 15, 2017, pp. 80-94, ScienceDirect.

Publication Venue: IP.com PAD, Apparatus to arrive at an optimized topology of cloud operating system services, Publication Date May 8, 2015, IPCOM000241520D, 3 pages.

Publication Venue: IP.com PAD, System for Cloud Resources Utilization Analysis Based on Time Series Data Transformation, Publication Date Apr. 7, 2020, IPCOM000261818D, 2 pages.

Marcin Kolny, Scaling up the Prime Video audio/video monitoring service and reducing costs by 90%, Tech, Video Streaming, The move from a distributed microservices architecture to a monolith application helped achieve higher scale, resilience, and reduce costs, Mar. 22, 2023, 8 pages.

IPCOM000272872D, EcoCloud Advisor: Empowering Sustainable Cloud Architectures through Dynamic Recommendations, Publication Date: Aug. 28, 2023, 2 pages.

Design well-architected cloud topologies, Cloud Architecture Center, Retrieved from Internet on Mar. 18, 2024: https://cloud.google.com/architecture, 11 pages.

Hybrid cloud architectures, Retrieved from Internet on Mar. 18, 2024: https://www.ibm.com/architectures, 8 pages.

Browse Azure Architectures, Retrieved from Internet on Mar. 18, 2024: https://learn.microsoft.com/en-us/azure/architecture/browse/, 4 pages.

IBM. "AI Insights and dashboards", retrieved from web https://www.ibm.com/products/turbonomic/dashboards?utm_content=SRCWW&p1=Search&p4=43700081200361419&p5=e&p9=58700008821968164&gclsrc=aw. Ds&gad_source=1&gad_campaignid=21985111677&gclid=CjwKCAjwgb_CBhBMEiwA0p30ONzJf2MBVZziA6JBiogZO smcUfAUTNdbD-xhq_Ws_O2e-YuqY5gMCRoCxFMQAvD_BWE, downloaded from internet on Jul. 1, 2025, 9 pages.

* cited by examiner

CLOUD TOPOLOGY OPTIMIZATION USING A GRAPH CONVOLUTIONAL NETWORK MODEL

BACKGROUND

The present invention relates to network topology optimization and more specifically, to network topology optimization using a graph convolutional network (GCN) model.

SUMMARY

Embodiments of the present invention provide a method, a computer program product, and a computer system, for network topology optimization. One or more processors of a computer system train a graph convolutional network (GCN) model using training network topology datasets as input. A collection of network topology datasets comprises the training network topology datasets. Each topology dataset in the collection includes: (i) a specified network topology and an associated optimal network topology and an optimality function value for the optimal network topology, (ii) relative weights of optimality parameters including performance (p), availability (a), and scalability(s), and (iii) an identification of an optimality function of the optimality parameters weighted by the relative weights. The specified network topology in each network topology dataset comprises components, relationships between the components, and metadata pertaining to the components. Each output node in an output layer of the GCN model includes an optimality function value of the optimality function for a different candidate network topology selected from the group consisting of an expanded network topology relative to the specified network topology and a contracted network topology relative to the specified network topology. One of the output nodes identifies an optimum network topology relative to the specified network topology as being the candidate network topology having a highest optimality function value in comparison with the optimality function value in all of the other output nodes.

DETAILED DESCRIPTION

Embodiments of the present invention train a graph convolutional network (GCN) model to identify an optimum network topology relative to a specified network topology.

A graph convolutional network (GCN) model is a neural network model that operates on graphs.

The optimum network topology, which is selected from multiple candidate topologies, has a highest optimality function value in comparison with the remaining candidate topologies. The optimum network topology is identified in output nodes of the GCN model.

A network topology includes an arrangement of components, relationships between the components, and metadata related to the components and/or relationships. The components may include, inter alia, devices, servers, switches, routers, data storage, databases, software, etc. A network architecture may encompass multiple network topologies.

Figure 1A:
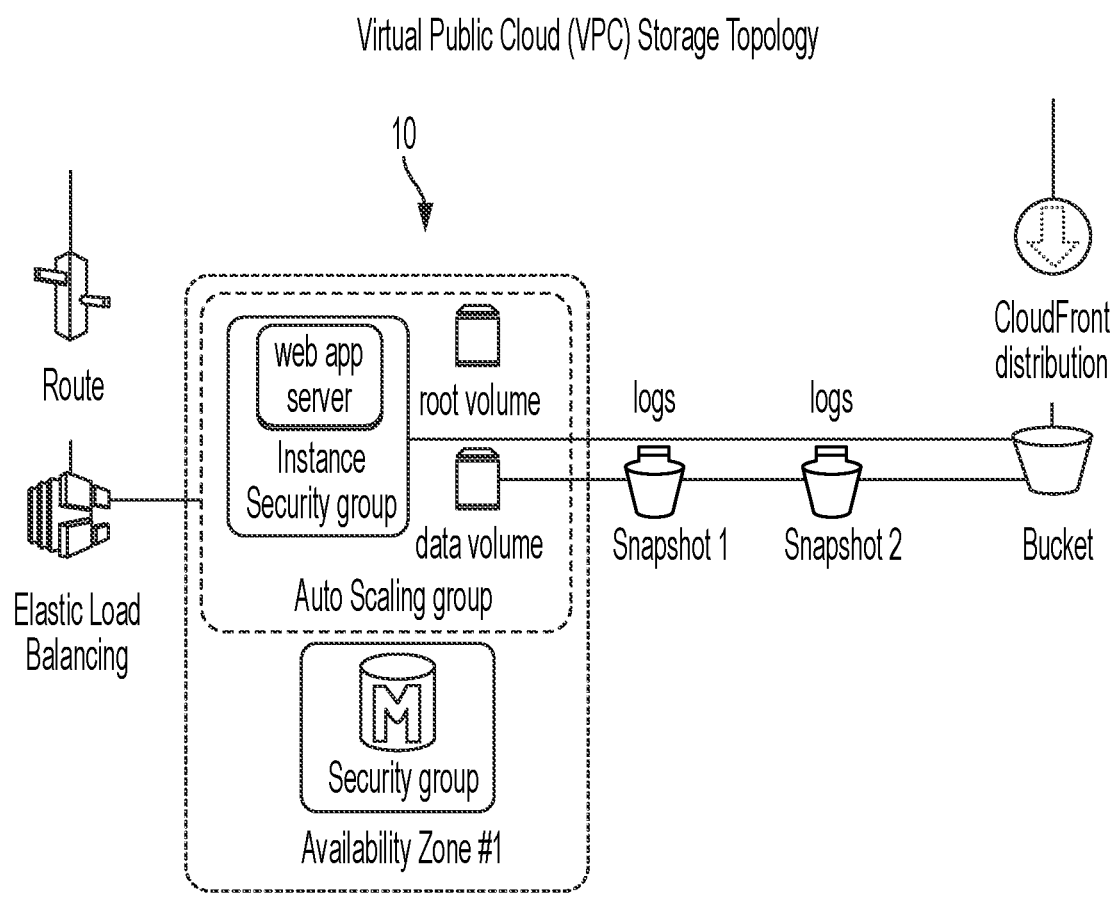
FIG. 1A, FIG. 1B and FIG. 1C each depict a different illustrative network topology for Virtual Public Cloud (VPC) storage topology, Cloud Security topology, and a Virtual Public Cloud (VPC) network topology, respectively, in accordance with embodiments of the present invention.
Figure 1B:
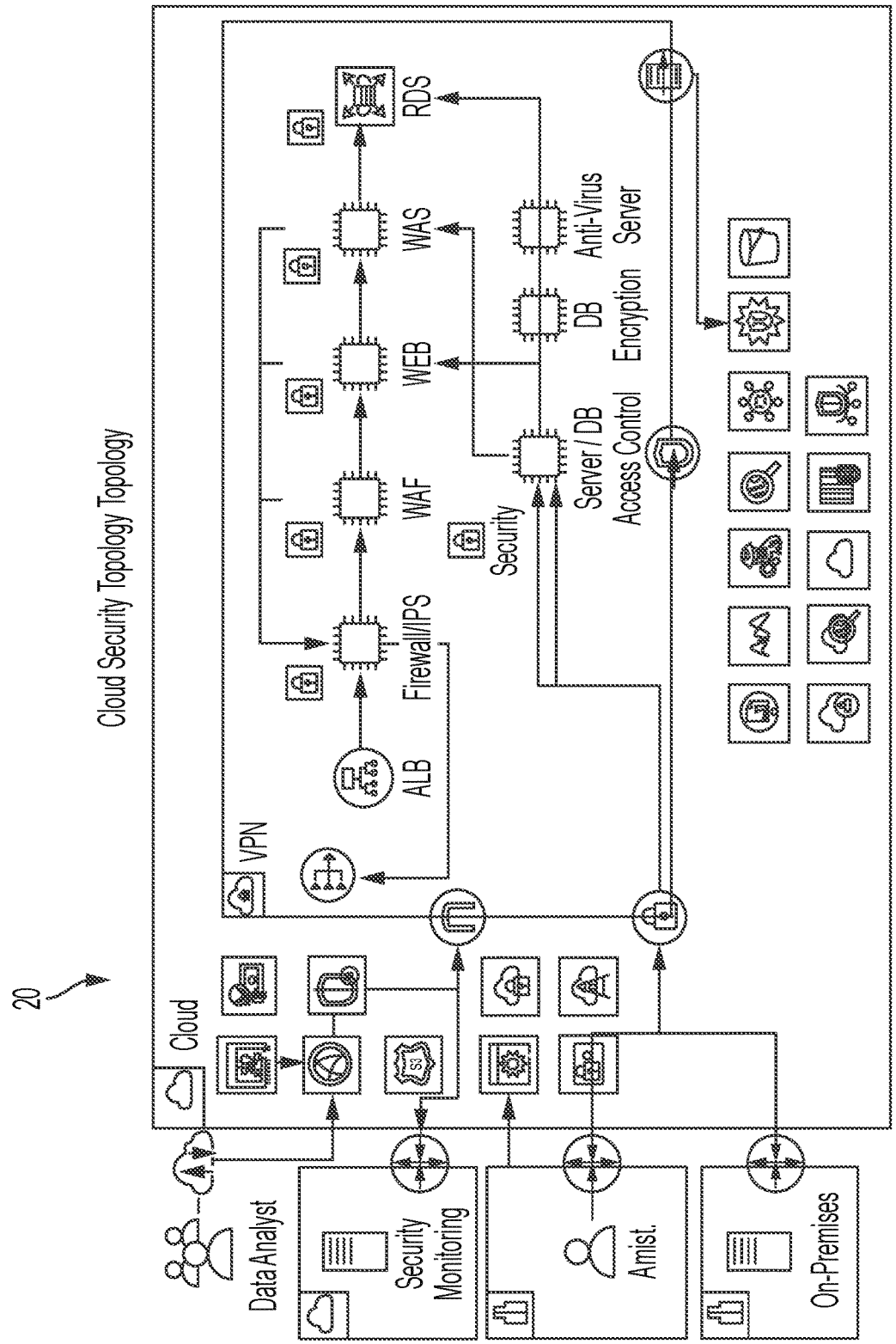
Figure 1C:
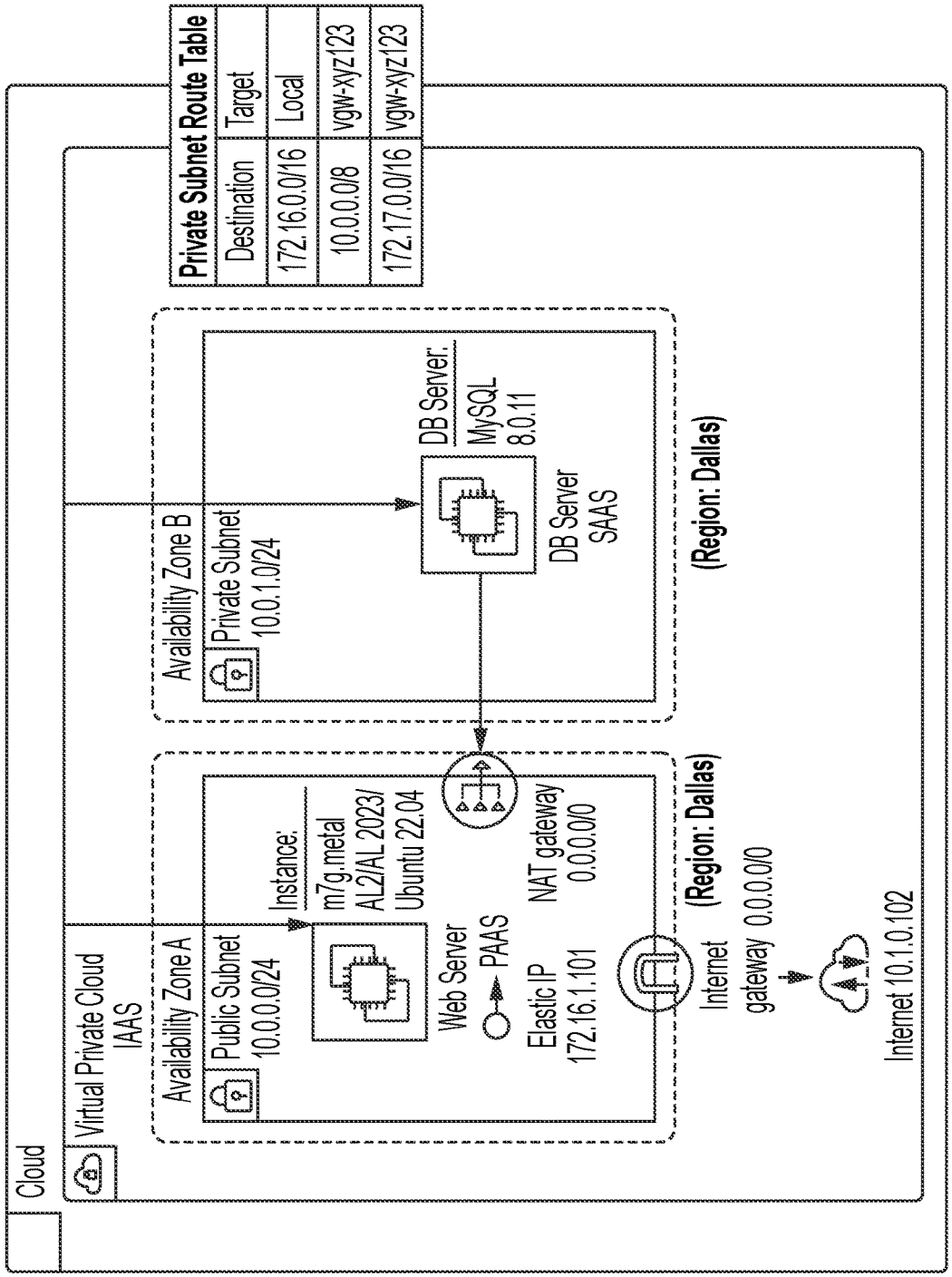

FIG. 1A, FIG. 1B and FIG. 1C each depict a different illustrative network topology for Virtual Public Cloud (VPC) storage topology 10, Cloud Security topology 20, and a Virtual Public Cloud (VPC) network topology 30, respectively, in accordance with embodiments of the present invention. Each network topology in FIGS. 1A-1C, and any other network topology, can be represented by an architecture diagram that includes components, relationships, and metadata related to the components and/or relationships.

Each architecture diagram in FIGS. 1A, 1B, and 1C depicts a network topology 10, 20, and 30, respectively, of a network architecture in different formats (e.g., .jpg, xml, and other tool-based diagrams such as draw.io). The data describing the network topologies can be stored in object stores.

For each network architecture, multiple network topologies may be collected. Each network topology could represent one version of the network architecture (e.g., one network architecture having high performance; one network architecture having high availability (a); one network architecture having high scalability(s); etc.).

Figure 2A:
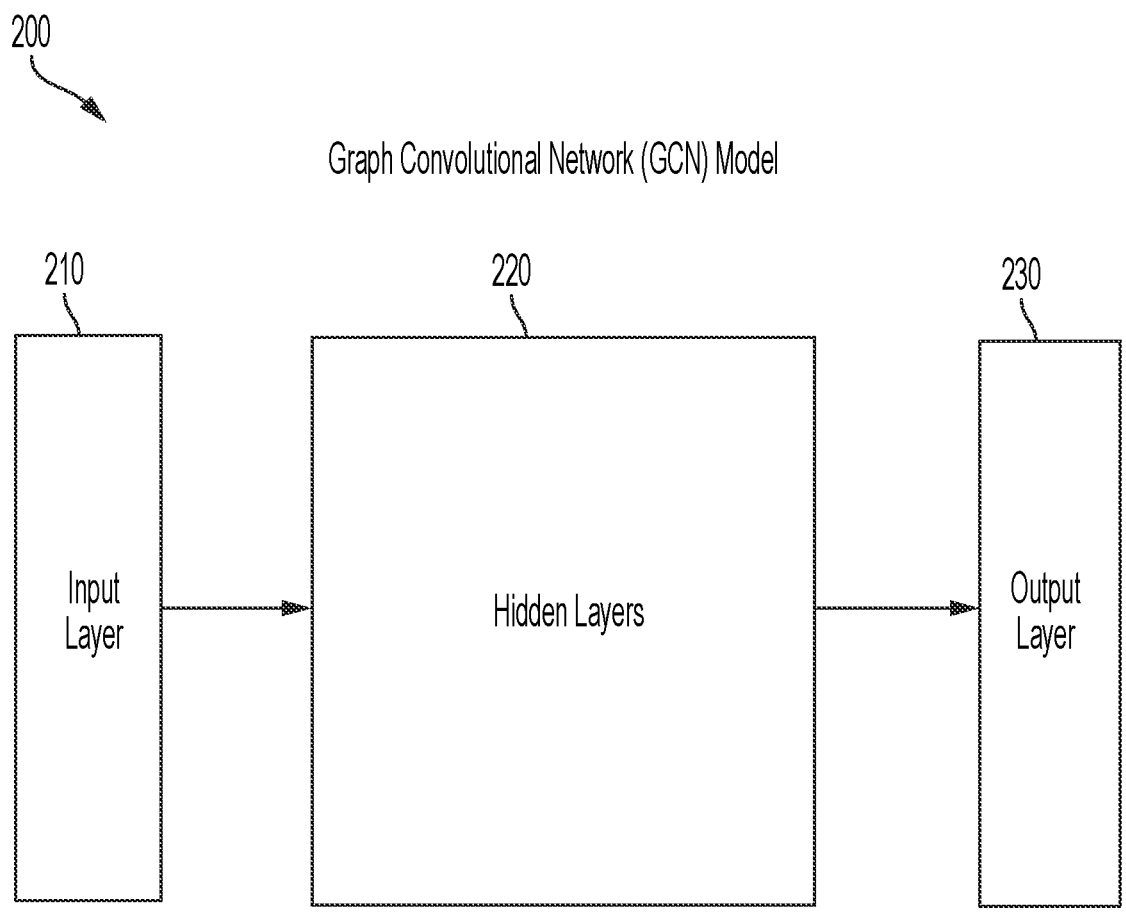
FIG. 2A depicts a graph convolutional network (GCN) model, in accordance with embodiments of the present invention.

FIG. 2A depicts a graph convolutional network (GCN) model 200, in accordance with embodiments of the present invention. The CGN model 200 includes an input layer 210, hidden layers 220, and an output layer 230.

The input layer 210 contains a graphical representation of a specified network topology.

The hidden layers 220 utilize the content of the input layer 210 to determine an optimum network topology relative to the specified network topology. The optimum network topology relative to the specified network topology is a modification of the specified network topology consisting of either: (i) an expanded network topology relative to the specified network topology which is the specified network topology modified by an addition of at least one specified component or (ii) a contracted network topology relative to the specified network topology which is the specified network topology modified by a subtraction of at least one component from the specified network topology.

The determination of the optimum network topology is based, at least in part, on an optimality function of network topology optimality parameters of performance (p), availability (a), and scalability(s).

In embodiments, a measure of performance (p) of a network topology may be one of, or any combination of, performance parameters of, inter alia: bandwidth, latency (delay), throughput, jitter, etc.

Availability (a) of the network topology is defined as network uptime divided by the total time in a given period.

In embodiments, a measure of availability (a) of a network topology may be one of, or any combination of, availability parameters of, inter alia: size of the network's subnets, redundancy of network components (e.g., servers, routers) within the network, network response time to accommodate changes in network components or in the number of network components, etc.

Scalability(s) of the network topology is defined as an ability of the network topology to accommodate an increase in: amount of components, connections between components, quantity of data used and/or stored, data traffic, etc.

In embodiments, a measure of scalability(s) of a network topology may be one of, or any combination of, scalability parameters of, inter alia: network data storage capacity for enabling the network to store additional data, bandwidth capacity for enabling the network to handle increased data traffic, quantity of additional components and/or resources available to the network, etc.

The output layer 230 identifies the optimum network topology that was determined by the hidden layers 220. The optimum network topology is identified in output nodes of the output layer 230 of the GCN model 200.

Figure 2B:
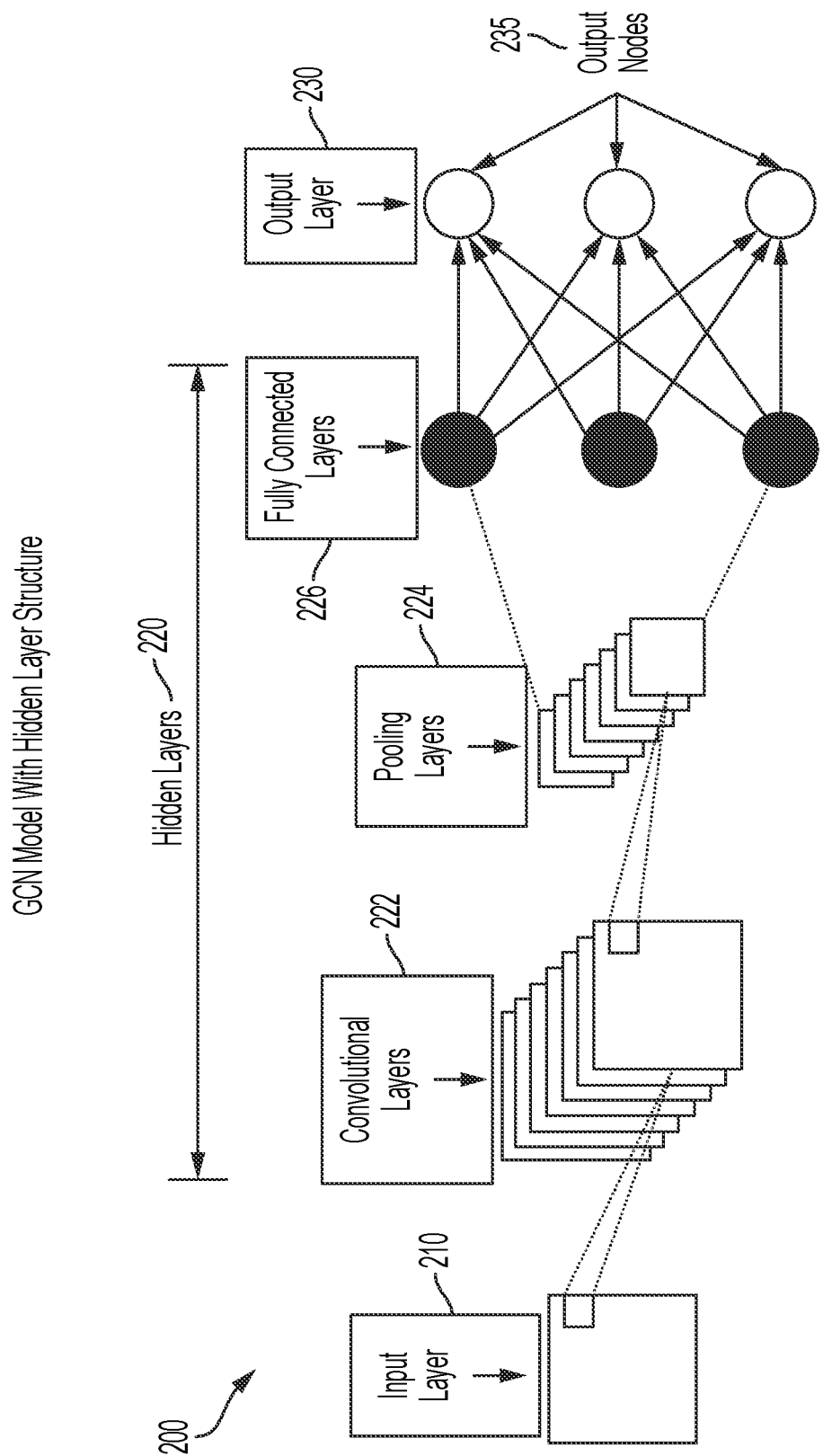
FIG. 2B is the GCN model of FIG. 2A with a depiction of a hidden layer structure of hidden layers, in accordance with embodiments of the present invention.

FIG. 2B is the GCN model 200 of FIG. 2A with a depiction of a hidden layer structure of the hidden layers 220, in accordance with embodiments of the present invention.

The hidden layer 220 encompasses sequentially: one or more convolutional layers 222 comprising convolutional nodes, one or more pooling layers 224 comprising pooling nodes, and one or more fully connected layers 226 comprising connection nodes and a weight and bias associated with each connection node in each fully connected layer.

The input layer 210 is directly connected to the one or more graph convolutional layers 222. The input layer 210 comprises nodes and edges connecting some of the nodes, wherein for the specified network topology: (i) each node of the input layer 210 represents the components of the specified network topology and includes features associated with or derived from the metadata of the specified components, (ii) each edge connecting two nodes represents a relationship between the two nodes, (iii) metadata related to the components and/or relationships are included in the specified network topology, and (iv) the features in the nodes of the input layer 210 area related to, and/or derivable from, the metadata.

The one or more graph convolutional layers 222 are directly connected to the one or more pooling layers 224.

In one embodiment, the one or more graph convolutional layers 222 consist of N graph convolutional layers ($GCL_1, \ldots, GCL_N$) and the one or more pooling layers 224 consist of one pooling layer (PL) positioned in the sequence of $GCL_1, \ldots, GCL_N$, PL, wherein $N \geq 1$.

In one embodiment, the one or more graph convolutional layers 222 consist of N graph convolutional layers ($GCL_1, \ldots, GCL_N$) and the one or more pooling layers 224 consist of N layers ($Pl_1, \ldots, PL_N$) and alternate in the sequence of $GCL_1, PL_1, \ldots, GCL_N, PL_N, \ldots$, wherein $N \geq 2$.

The one or more pooling layers 224 are directly connected to the one or more fully connected layers 226.

The one or more fully connected layers 226 are directly connected to the output layer 230.

The output layer 230 includes at least 2 output nodes 235. Each output node represents a different candidate network topology that is a candidate for being the optimum network topology relative to the specified network topology.

Figure 3:
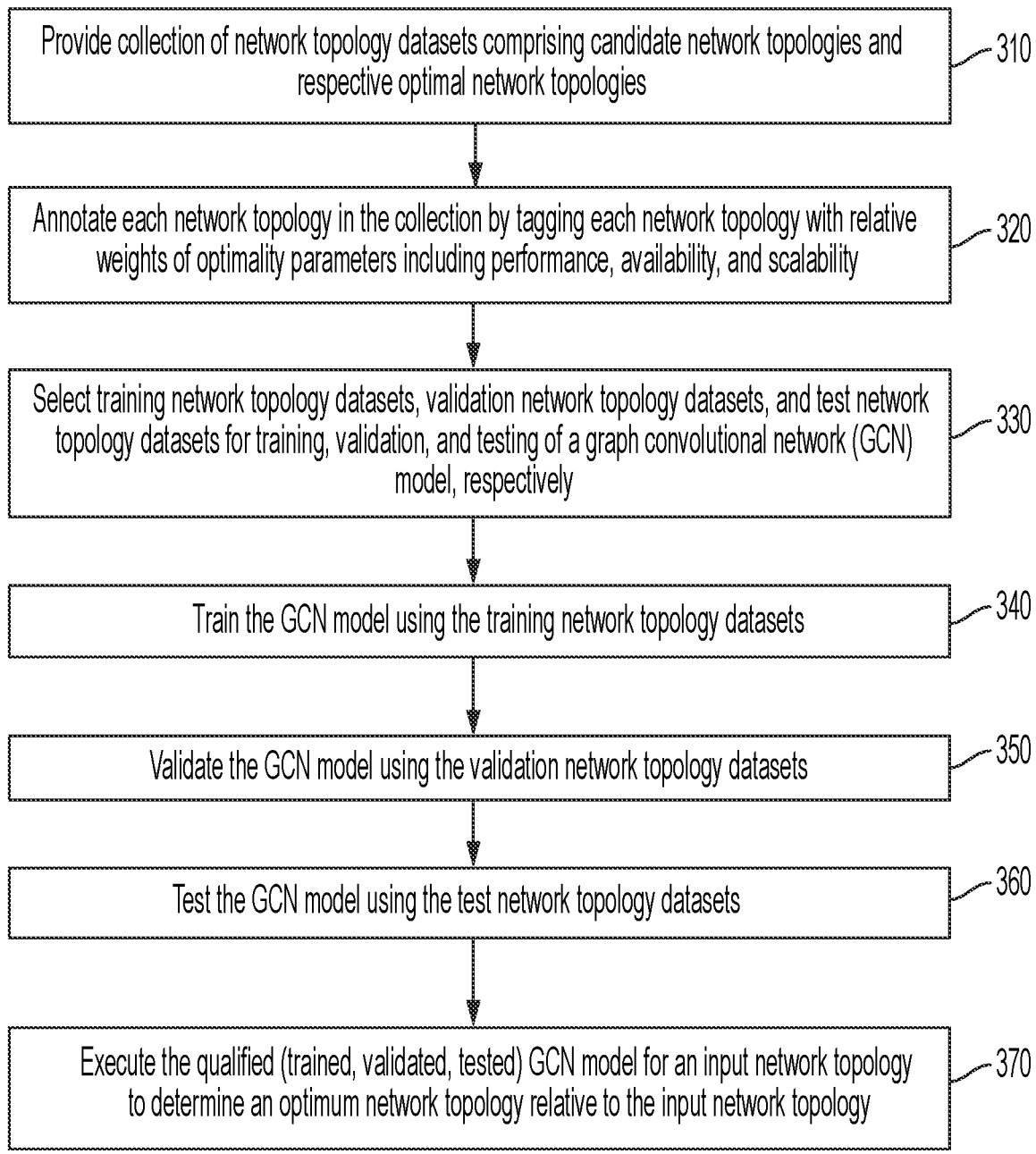
FIG. 3 is a flow chart describing qualification and subsequent execution of the graph convolutional network (GCN) model 200 of FIG. 2, in accordance with embodiments of the present invention.

FIG. 3 is a flow chart describing qualification and subsequent execution of the graph convolutional network (GCN) model 200 of FIG. 2, in accordance with embodiments of the present invention. The GCN model 200 is qualified if the GCN model 200 has been trained, validated, and successfully tested. Thus, the GCN model 200, if qualified, has met the quality assurance standards of training, validation, and testing.

The flow chart of FIG. 3 includes steps 310-370. Steps 310-360 qualify the GCN model 200. Step 370 executes the qualified GCN model 200.

Step 310 provides a collection of network topology datasets. Each network topology dataset in the collection includes a specified network topology.

Step 320 annotates each network topology in the collection by tagging each network topology with relative weights of optimality parameters which may include performance (p), availability (a), and scalability(s). Such tagging of relative weight is recorded in the respective network topology datasets.

Each network topology dataset includes: (i) a specified network topology and an associated optimal network topology and an optimality function value for the optimal network topology; (ii) relative weights of optimality parameters that include performance (p), availability (a), and scalability (s); and (iii) an identification of an optimality function of the optimality parameters weighted by the relative weights. The relative weights are provided (e.g., as input by a user) for each specified network topology. The GNC model 200 uses the optimality function of the optimality parameters weighted by the associated relative weights for determining output values in output nodes 235 in the output layer 230 of the GCN model 200. The output value in each output node of the output layer 230 is a value of the optimality function ("optimality function value") for a candidate network topology that is a candidate for being the optimum network topology relative to the specified network topology.

Step 330 selects (randomly in one embodiment), from the collection of network topology datasets provided in step 310, training network topology datasets, validation network topology datasets, and test network topology datasets for training, validation, and testing of the GCN model 200, respectively. The training network topology datasets, validation network topology datasets, and test network topology datasets are constrained to be mutually exclusive and include different specified network topologies.

In one embodiment, the number of training network topology datasets exceeds the number of validation network topology datasets which exceeds the number of test network topology datasets (e.g., in a proportionality of 70%: 20%: 10%).

Figure 5:
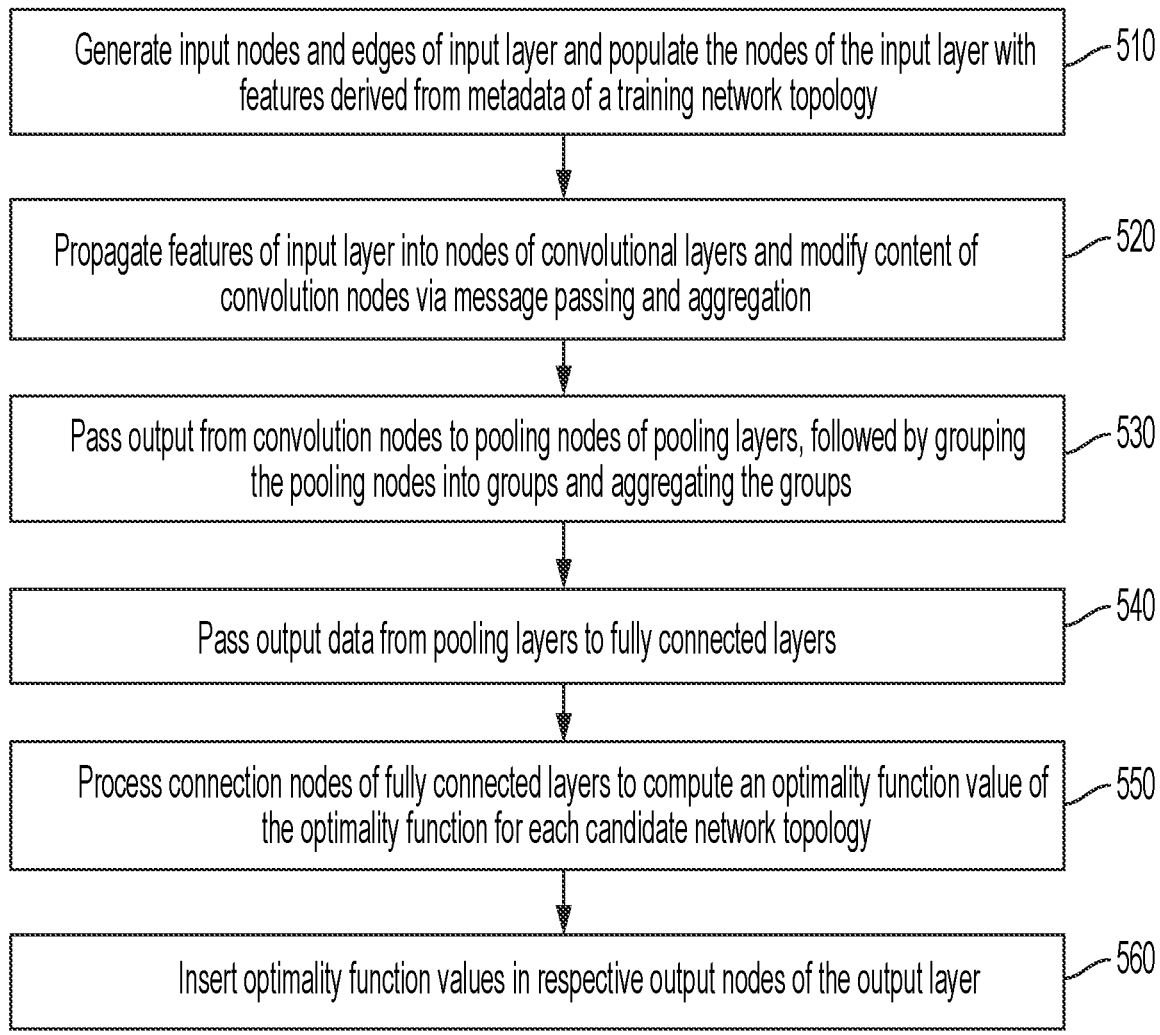
FIG. 5 is a flow chart describing a process of training the graph convolutional network (GCN) model of FIG. 2, in accordance with embodiments of the present invention.

Step 340 trains the GCN model 200 by a training process that uses the training network topology datasets. The training process determines the parameters (e.g., weights and biases of connection nodes in the fully connected layers 226) of the GCN model 200 needed to fit the GCN model 200 to data contained in the training network topology datasets. FIG. 5 described infra presents embodiments for implementing the training process of step 340.

Step 350 validates the GCN model 200 that was trained, by a validation process that uses the validation network topology datasets. The validation process determines whether the GCN model 200 is overfitting or underfitting the network topology data and accordingly fine-tunes the parameters of the GCN model 200 in response to determining such overfitting or underfitting.

Step 360 tests the GCN model 200 that was trained and validated, by a test process that uses the test network topology datasets. The test process tests the accuracy of the trained and validated GCN model 200, including using the parameters of the validated GCN model 200.

In summary, step 340 trains the GCN model 200 which includes establishing values of parameters of the GCN model 200, step 350 validates the GCN model 200 which may include fine tuning the values of the parameters of the GCN model 200, and step 360 tests the accuracy the trained and validated GCN model 200 without changing the values of any of the parameters of the GCN model 200.

The successfully tested GCN model 200 is said to be qualified. Thus, the GCN model 200 is qualified if the GCN model 200 has been trained, validated, and successfully tested. Accordingly, the qualified GCN model 200 has met the quality assurance standards of training, validation, and testing.

Step 370 executes the qualified GCN model 200, for a specified input network topology and specified relative weights of the optimality parameters of performance (p), availability (a), and scalability(s), to determine an optimum network topology relative to the input network topology. The specified input network topology can be any network topology. In one embodiment, the input network topology is generated in accordance with the process in FIG. 8 described infra.

The optimum network topology is identified in output nodes 235 in the output layer 230 of the qualified GCN model 200 having been executed. Execution of the qualified GCN model 200 populates the output nodes 235 of the output layer 230 with respective output values, and the output node having the highest output value is the optimum network topology relative to the input network topology. The output value in each output node of the output layer 230 is an optimality function value for one candidate network topology of M candidate network topologies, wherein M≥2. Each candidate network topology is a candidate for being the optimum network topology relative to the specified network topology.

In one embodiment, the candidate network topologies used in the execution of the qualified GCN model 200 may be selected randomly.

In one embodiment, the candidate network topologies used in the execution of the qualified GCN model 200 may be provided as input (e.g., by a user) to the qualified GCN model 200.

For a specified set of candidate network topologies, with each candidate network topology being represented in a unique output node in the output layer 230, one of the candidate network topologies is the optimum network topology by having a highest optimality function value in comparison with the other candidate network topologies.

The optimum network topology resulting from execution of the qualified GCN model 200 is one candidate network topology of the M candidate network topologies (M≥2). Each candidate network topology is either: (i) an expanded network topology relative to the specified network topology (ii) or a contracted network topology relative to the specified network topology. An expanded network topology relative to the specified network topology is defined as the specified network topology modified by an addition of at least one specified component. A contracted network topology relative to the specified network topology is defined as the specified network topology modified by a subtraction of at least one component from the specified network topology.

Figure 4A:
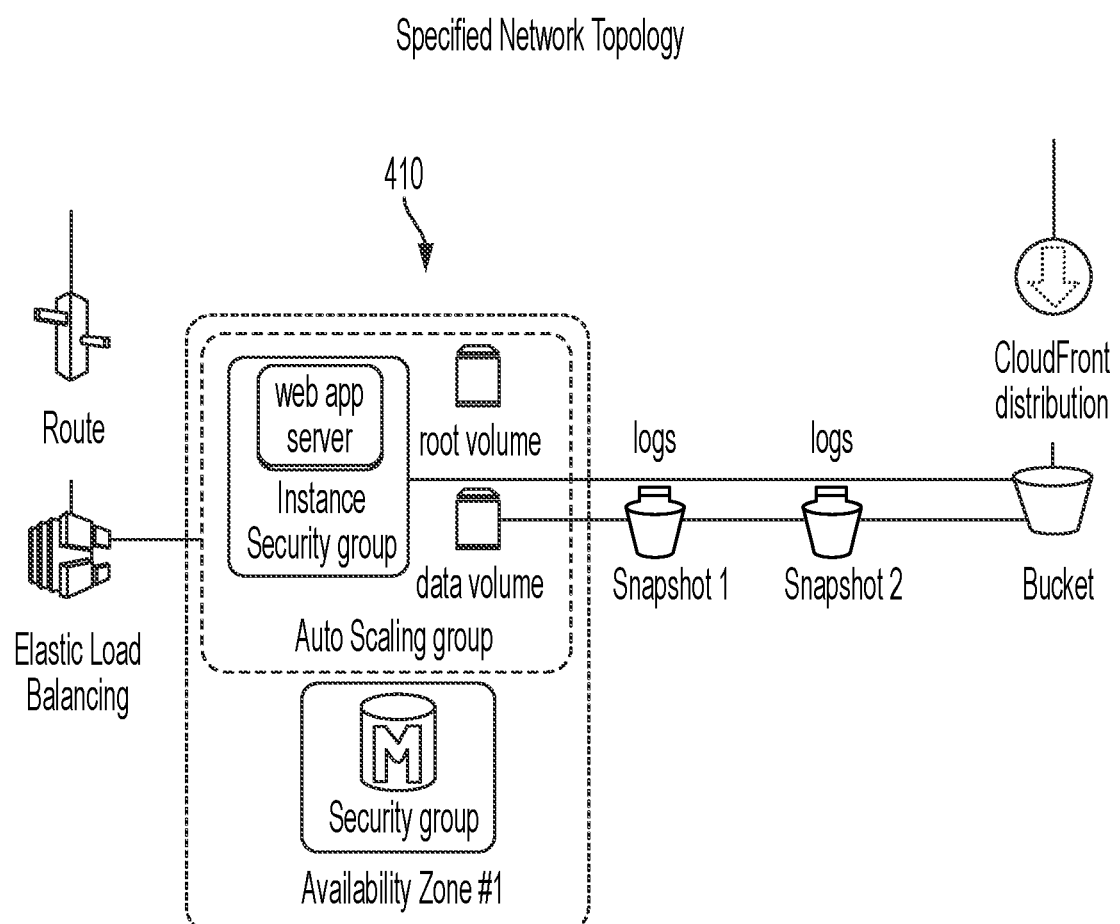
FIG. 4A depicts an illustrative specified network topology serving as input to execution of the qualified GCN model.
Figure 4B:
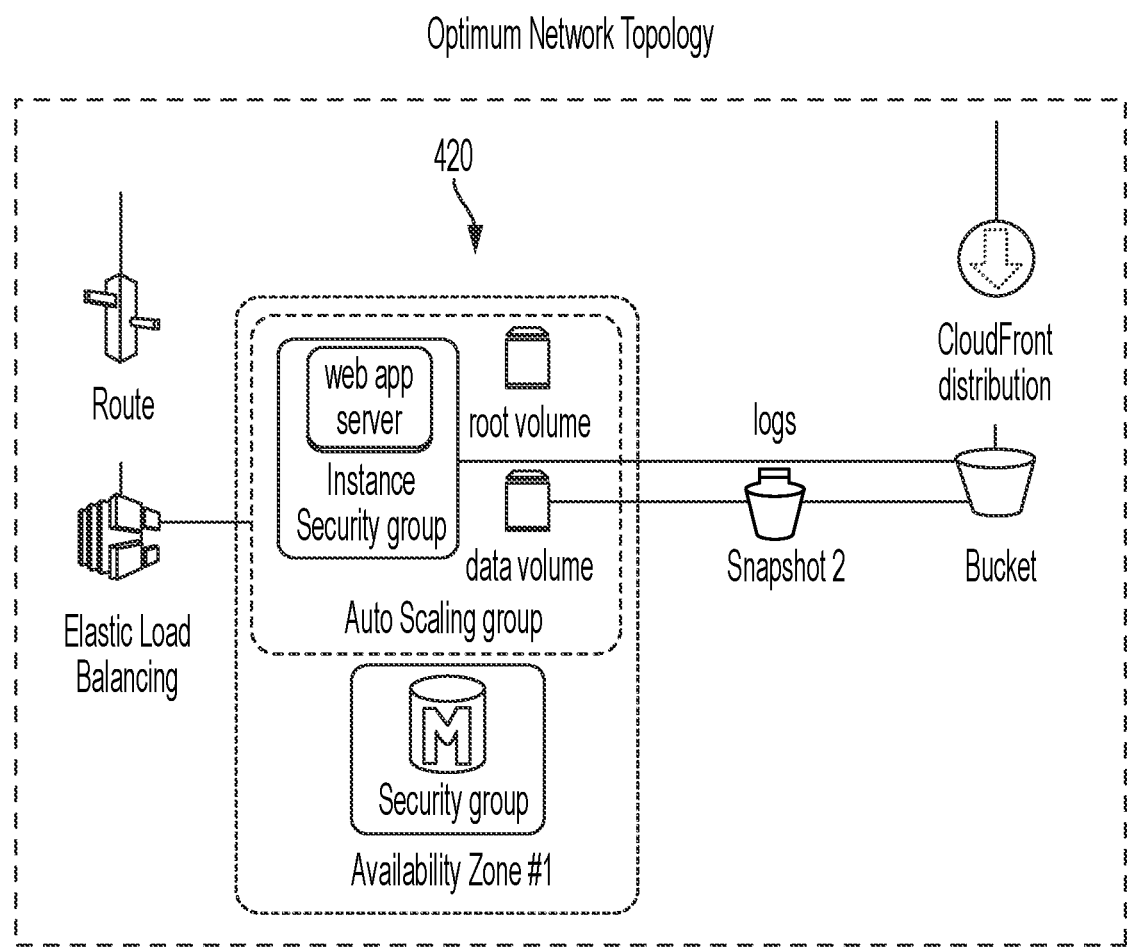
FIG. 4B depicts an optimum network topology relative to the input network topology resulting from execution of the qualified GGN model, in accordance with embodiments of the present invention.

FIG. 4A depicts an illustrative specified network topology 410 serving as input to execution of the qualified GCN model 200 in step 370, and FIG. 4B depicts an optimum network topology 420 relative to the input network topology 410 resulting from execution of the qualified GGN model 200 in step 370, in accordance with embodiments of the present invention.

The optimum network topology 420 differs from the input network topology 410 in that the Snapshot 1 in the input network topology 410 does not exist in the optimum network topology 420. Therefore, the optimum network topology 420 is a contracted network topology relative to the input network topology 410.

FIG. 5 is a flow chart describing a process of training the graph convolutional network (GCN) model 200 of FIG. 2, in accordance with embodiments of the present invention. The process in FIG. 5 implements step 340 of FIG. 3.

The flow chart of FIG. 5 includes steps 510-560 which are performed for each specified network topology in the training network topology datasets. Each such specified network topology in the training network topology datasets is a training network topology associated with a training network topology architecture.

Step 510 generates nodes (called "input nodes") and edges of the input layer 210 and populates the input nodes with features associated with or derived from the metadata of the training network topology.

Each input node represents a component, and each edge represents a relationship between the components connected by the edge.

The input nodes are connected, and not connected, by an edge as described by an adjacency matrix A, wherein $A_{ij}=1$ or 0 if input node i and input node j are connected or not connected, respectively, by an edge.

The components, relationships, and metadata are extracted from the training network topology using known text/image extraction techniques.

The features are numerical values of characteristics of the network topology such as, inter alia, edge distances, transmission speed of data transfer between nodes, time of travel (latency) of data transmission between nodes, volume of data capacity at a node, measure of data security protection at each node, measure of ability to contain and isolate network failures, maximum distance between connected devices in the network, measure of ease with which the network can adapt to changes, geographical coordinates of devices, time stamps indicating when nodes and/edges were created or modified, etc.

Figure 6:
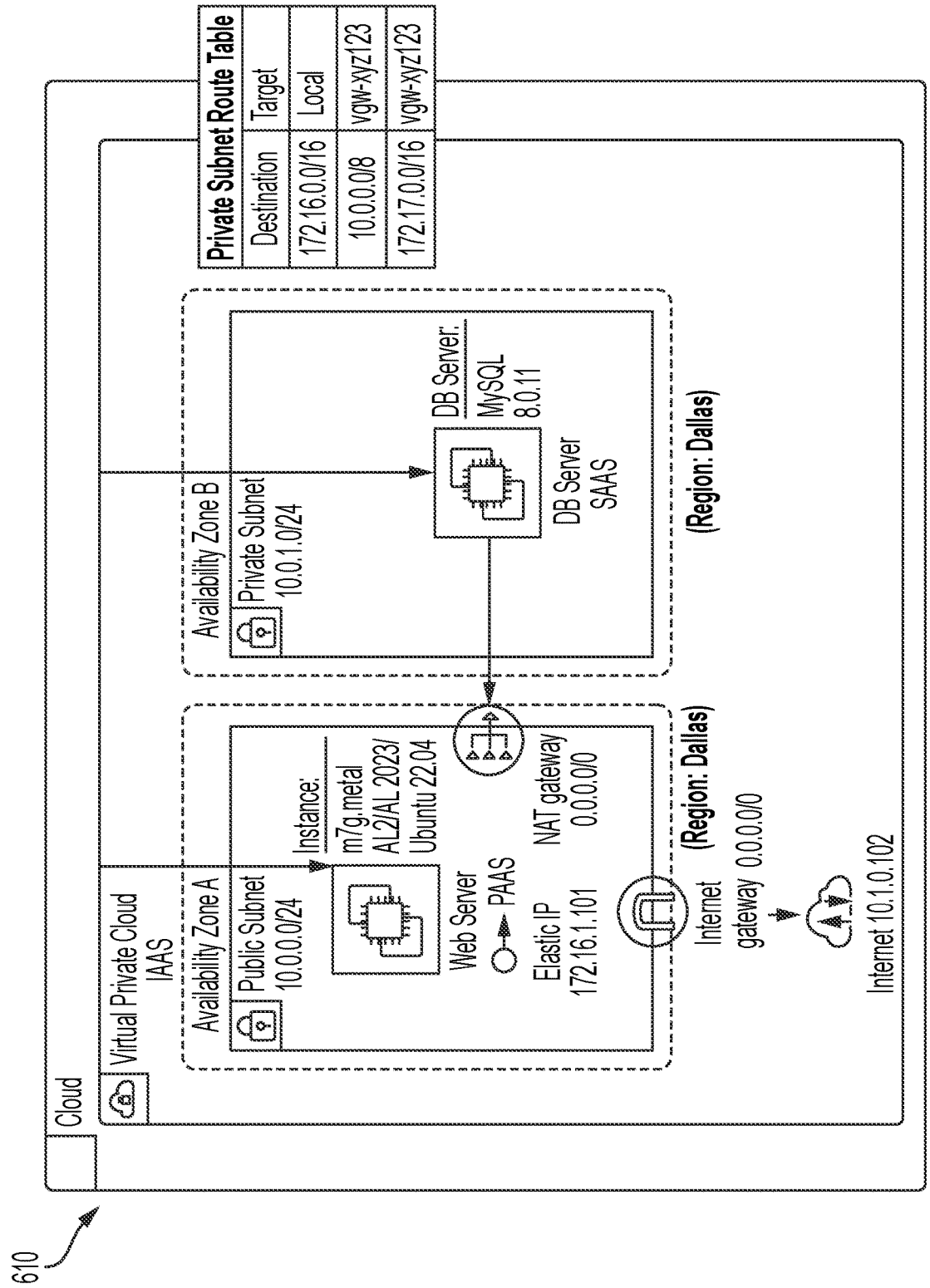
FIG. 6 depicts an illustrative network topology of a Virtual Public Cloud (VPC) architecture, in accordance with embodiments of the present invention.

FIG. 6 depicts an illustrative network topology 610 of a Virtual Public Cloud (VPC) architecture, in accordance with embodiments of the present invention. Node representations, edge representations, and metadata may be extracted from the network topology in FIG. 6 as follows.

Examples of node representations in FIG. 6 include: (i) VPC: represents the Virtual Private Cloud which may be a foundational networking component in a cloud computing service; (ii) Availability Zone A, Availability Zone B: represents the discrete data center; (iii) Public Subnet, Private Subnet: represents a range of Internet Protocol (IP) addresses in a VPC; (iv) Web Server: represents a virtual server running an application deployed on the Web Server; (v) DB Server: represents a database instance which could be hosted on a relational database service (RDS) or a self-managed database; (vi) NAT Gateway, Internet Gateway, Internet, Elastic IP: represents the virtual private network connections used to securely connect the VPC to an on-premises network.

Examples of edge representations in FIG. 6 include: (i) VPC-to-Web Server: represents the network connection between the VPC and the Web Server instance, indicating that the Web Server instance is deployed within the VPC; (ii) VPC-to-DB Server: represents the network connection between the VPC and the Database Server instance, indicating that the DB Server instance is deployed within the VPC; (iii) NAT Gateway to DB Server: represents the network connection between the NAT Gateway and the database, indicating the communication with the database; (iv) Internet Gateway to Internet: represents the network connection between the Internet gateway and, indicating that the VPC is connected to an on-premises network via VPN.

Examples of metadata in FIG. 6 include: (i) VPC Metadata: includes information such as Deployment Model (IAAS: Infrastructure-as-a-Service), classless inter-domain routing (CIDR) block (if any), and any associated subnets (e.g., 10.0.0.0/24, 10.0.1.0/24), route tables, and network access control lists (ACLs) (if any); (ii) Web Server Metadata: includes information such as Deployment Model (PAAS: Platform-as-a-Service), instance type (e.g., m7g.metal), operating system (e.g., AL2/AL 2023/Ubuntu 22.04), elastic IP addresses (e.g., 172.16.1.101) and associated security groups (if any); (iii) Database Metadata: includes information such as Deployment Model (SAAS: Software-as-a-Service), database type (e.g., MySQL), engine version (e.g., 8.0.11), and associated security groups (if any); (iv) VPN Metadata: includes VPN information such as Elastic IP (e.g., 172.161.101), Internet Gateway Id (0.0.0.0/0), network address translation (NAT) gateway ID (e.g., 0.0.0.0/0), Internet (e.g., 10.10.102) details.

Returning to FIG. 5, step 520 propagates the features in the input nodes of the input layer 210 into the convolutional layers 222 to modify content of convolution nodes of the convolutional layers 222 via message passing and aggregation. The message passing and aggregation enables learning of node representations that capture structural dependencies and interactions.

Message passing involves passing messages (i.e., features) between connected nodes in the convolutional layers 222. Each convolutional node sends messages containing its own features to its neighboring nodes. A neighboring node B of node A is directly adjacent to node A such that there is no intervening node between node A and node B. In one embodiment, each convolutional node sends all of its features to its neighboring nodes. In one embodiment, each convolutional node sends a specified subset of its features to its neighboring nodes.

Aggregation is a process that combines the messages (features) received by each convolutional node from neighboring nodes to update the representation of each convolutional node. This updated representation at each convolutional node receives information (features) from the convolutional node's neighboring nodes and aggregates the received information via a mathematical function (e.g., maximum value, mean value, root-mean-square value, a linear function, a non-linear function).

In one embodiment, each feature received by each convolutional node from a neighboring node may be transformed by an activation function (e.g., rectified linear unit (ReLU), sigmoid function, etc.) prior to being combined with the received features from the other neighboring nodes for updating the representation at each convolutional node.

An adjacency matrix A has elements $A_{ij}$ for convolutional nodes i and j such that $A_{ij}=1$ or 0 if convolutional node i and convolutional node j are respectively connected or not connected by an edge.

The adjacency matrix helps define the neighborhoods structure of each convolutional node in the convolutional layers 222.

For each convolutional node in the convolutional layers 222, the adjacency matrix is multiplied with a feature matrix to aggregate information from the neighboring nodes, which allows each convolutional node to incorporate information from the convolutional nodes in each convolutional node's local neighborhood.

The adjacency matrix can also be normalized to account for differences in the number of neighbors for each node, ensuring that the convolutional operation is scale-invariant and stable.

Each convolutional layer applies a set of convolutional filters to the input features, resulting in transformed representations of the nodes. These transformed representations capture increasingly abstract and complex features of the nodes and relationships between the nodes.

The convolutional layers 222 detect patterns and features in input nodes of the input layer 210, by using convolutional filters or kernels to slide over the input data and extract local patterns. The output of a convolutional layer is a feature map that highlights specific features or patterns.

Each convolutional layer is initialized independently with the convolutional layer's own set of weights and biases. In one embodiment, these weights and biases are randomly initialized or initialized using predefined techniques before training begins.

The convolutional layers 222 learn to extract meaningful features from the input node representations and propagate the meaningful features through nodes of the GCN model 200 to generate informative representations for downstream tasks.

The convolutional layers 222 are enabled to adapt and refine their parameters based on the training data, improving the performance of the GCN model 200 on the given task.

The number of convolutional layers and the size of each convolutional layer (i.e., the number of neurons or filters) are determined based on the architecture and design of the GCN model 200.

Step 530 passes output from convolution nodes of convolutional layers 222 to pooling nodes of pooling layers 224, followed by grouping the pooling nodes into groups and aggregating the groups. The groups are aggregated to create a single representative node. Aggregating the groups combines the features of nodes within each group to create a feature vector of the representative node.

Depending on the pooling method (e.g., max pooling, average pooling), different aggregation functions are applied to obtain the representative node features. Max pooling and average pooling respectively use the maximum value and average value from a group of values.

The pooling layers 224 down-sample the spatial dimensions of the feature map outputted by the convolutional layers 222 while preserving information learned by the convolutional layers 222.

After several convolutional layers 222 have learned features and relationships between instances, the pooling layers 224 aggregate information from groups of instances to create a coarser representation such as by, inter alia: (i) grouping instances by subnet or availability zone; (ii) applying max pooling within each group to select the most relevant features; (iii) creating representative nodes for each group with aggregated features; (iv) capturing, via the coarser representation, high-level patterns and structures, which can be used for downstream tasks such as performance prediction or anomaly detection.

Output from the pooling layers 224 serves as input to the fully connected layers 226 for further processing and predicting the optimum network topology.

Step 540 passes output data from the pooling layers 224 to the connection nodes of the fully connected layers 226. In the fully connected layers 226, all layer-to-layer possible connections are present and each node has an associated weight and bias.

Step 550 processes the connection nodes of the fully connected layers 226 to compute an optimality function value of the optimality function for each candidate network topology. During the processing of the connection nodes of the fully connected layers 226, weights and biases are iteratively updated using backpropagation and optimization techniques to minimize a loss function as discussed infra in conjunction with FIG. 7 which presents embodiments for implementing the processing of the connection nodes of step 550.

Step 560 inserts the optimality function values for each candidate network topology in respective output nodes 235 of the output layer 230.

Figure 7:
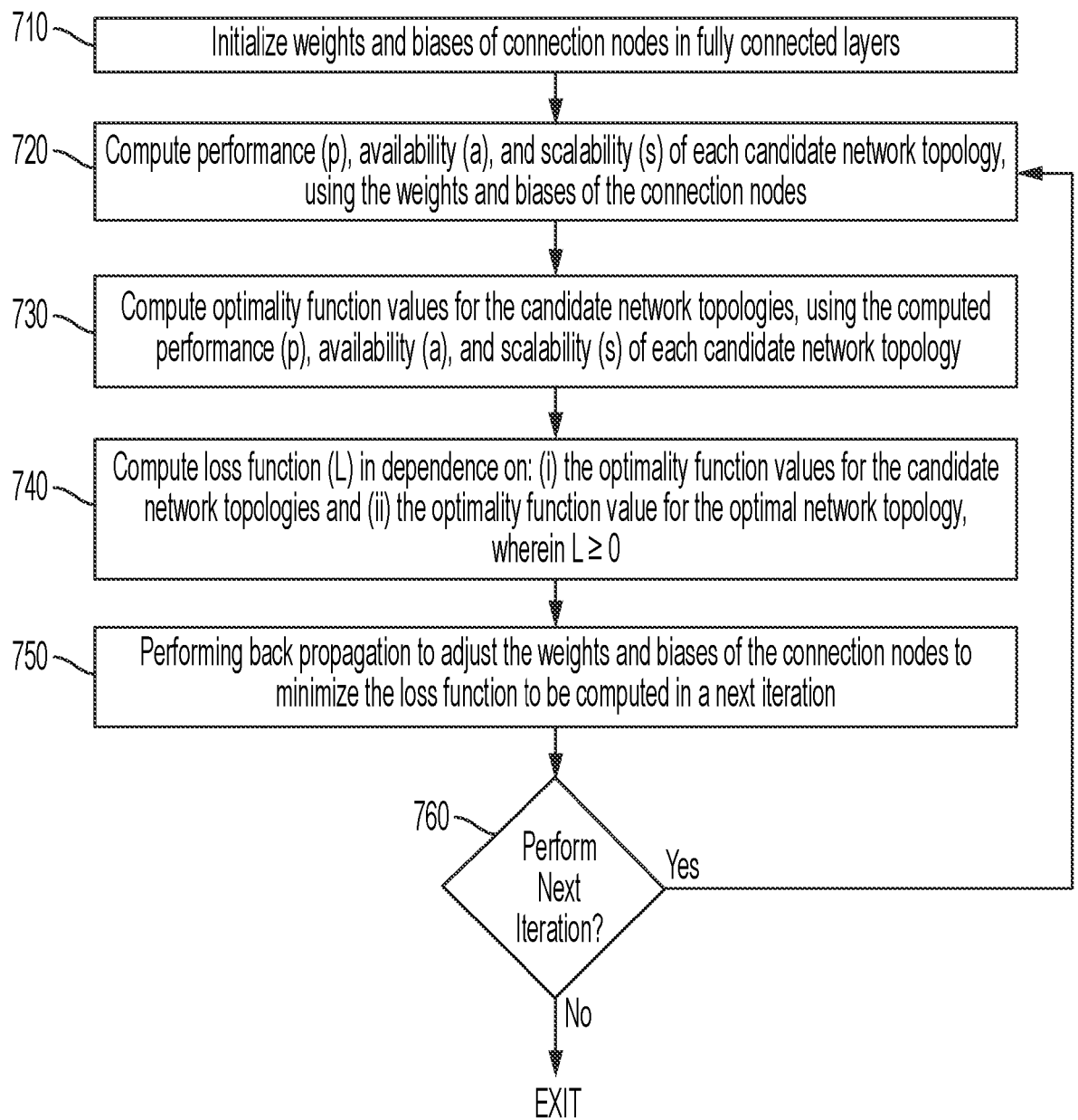
FIG. 7 is a flow chart describing a process for processing the connection nodes of the fully connected layers, in accordance with embodiments of the present invention.

FIG. 7 is a flow chart describing a process for processing the connection nodes of the fully connected layers 226, in accordance with embodiments of the present invention. The process in FIG. 7 represents step 550 of FIG. 5.

The flow chart of FIG. 7 includes steps 710-760

Step 710 initializes the weights and biases of the connection nodes in fully connected layers 226.

Initialization of the weight may be performed by any method, including any known method, such as, inter alia: (i) initializing the weights with values randomly sampled from a probability distribution (e.g., a uniform probability distribution, a Guassian probability distribution, etc.; (ii) initializing the weights with constant values such a small number (e.g., in a range of [−0.1, 0.1]) randomly selected from a uniform probability distribution; initializing the weights to be uniformly distributed weights across the connection nodes and in a specified range (e.g., [−0.1, 0.1]).

Initialization of the biases may be performed by any method, including any known method, such as, inter alia: initializing the weights with constant values such as zero or a small number (e.g., in a range of [−0.1, 0.1]) randomly selected from a uniform probability distribution.

Steps 720-760 perform each iteration of an iterative process with the fully connected layers 226 of the GCN model 200 to determine, in each iteration, values of an optimality function ("optimality function value") of each candidate network topology of M candidate network topologies (M≥2) for the specified network topology used in each iteration and obtained from the training network topology datasets.

In one embodiment, the candidate network topologies used in the training, as well as in the validation and testing, of the GCN model 200 may be selected randomly.

In one embodiment, the candidate network topologies used in the training, as well as in the validation and testing, GCN model 200 may be provided as input (e.g., by a user) to the GCN model 200.

Each candidate network topology is either: (i) an expanded network topology relative to the specified network topology (ii) or a contracted network topology relative to the specified network topology. An expanded network topology relative to the specified network topology is defined as the specified network topology modified by an addition of at least one specified component. A contracted network topology relative to the specified network topology is defined as the specified network topology modified by a subtraction of at least one component from the specified network.

For each iteration of the iterative process in which one of the specified network topologies is processed, an optimum network topology is selected from M candidate network topologies, wherein M≥2. The candidate network topology having the highest optimality function value is the optimum network topology with respect to the specified network topology.

Step 720 computes performance (p), availability (a), and scalability(s) of each candidate network topology, using the weights and biases of the connection nodes.

For embodiments of the present invention, measures of performance (p), availability (a), and scalability(s) of each candidate network topology depend on the metadata and are thus reflected in the features which are associated with or are derived from the metadata and are inserted in the input nodes of the input layer 220.

For example, a performance measure of throughput depends on metadata having an associated feature of transmission speed of data transfer between nodes, and such feature may be inserted in the input nodes of the input layer 210.

Since the features are propagated from the input nodes of the input layer 210 to the connection nodes of the fully connected layers 226 via the convolutional layers 222 and pooling layers 224, the performance (p), availability (a), and scalability(s) are each reflected in the weights and biases of the connection nodes. Thus, computation of performance (p), availability (a), and scalability(s) of each candidate network topology uses the weights and biases of the connection nodes.

Step 730 computes optimality function values for the candidate network topologies, using the computed performance (p), availability (a), and scalability(s) of each candidate network topology.

For m=1, . . . , M (M≥2) the optimality function $F_m(p_m, a_m, s_m)$ for candidate network topology m is a function of performance ($p_m$), availability ($a_m$), and scalability ($s_m$), wherein $p_m$, $a_m$, and $s_m$ are weighted by relative weights of $w_p$, $w_a$, $w_s$, respectively, wherein $w_p \geq 0$, $w_a \geq 0$, $w_s \geq 0$. In one embodiment, $w_p$, $w_a$, $w_s$, are normalized such that $w_p + w_a + w_s = 1$.

In one embodiment for candidate network topology m (m=1, . . . , M), the optimality function $F_m(p_m, a_m, s_m)$ is specified in Equation (1).

$$F_m(p_m, a_m, s_m) = w_p P(p_m) + w_a A(a_m) + w_s S(s_m) / \Sigma_m [w_p P(p_m) + w_a A(a_m) + w_s S(s_m)] \quad (1)$$

In Equation (1), $P(p_m)$ is a function of performance ($p_m$), $A(a_m)$ is a function of availability ($a_m$), and $S(s_m)$ is a function of scalability ($s_m$).

In Equation (1), $F_m(p_m, a_m, s_m)$ is normalized such that $\Sigma_m F_m(p_m, a_m, s_m)=1$, wherein the summation $\Sigma_m$ is from m=1 to m=M.

In one embodiment, $P(p_m)=p_m$, $A(a_m)=a_m$, and $S(s_m)=s_m$, so that $F_m(p_m, a_m, s_m)$ is a linear function of $p_m$, $a_m$ and $s_m$ as specified in Equation (2).

$$F_m(p_m,a_m,s_m)=w_p p_m+w_a a_m+w_s s_m/\Sigma_m[w_p p_m+w_a a_m+w_s s_m] \quad (2)$$

In one embodiment, $P_m(p_m)=(p_m)^r$, $A_m(a_m)=(a_m)^r$, and $S_m(s_m)=(s_m)^r$, wherein r>0 and r≠1 (e.g., r=0.5, r=2, r=3), so that $F_m(p_m, a_m, s_m)$ is a non-linear function of $p_m$, $a_m$ and $s_m$ specified in Equation (3).

$$F_m(p_m,a_m,s_m)=w_p(p_m)^r+w_a(a_m)^r+w_s(s_m)^r/\Sigma_m[w_p(p_m)^r+w_a(a_m)^r+w_s(s_m)^r] \quad (3)$$

Step 740 computes a loss function (L) in dependence on: (i) the optimality function values for the candidate network topologies and (ii) the optimality function value for the optimal network topology, wherein L≥0.

Given $F_m(p_m, a_m, s_m)$ (abbreviated as "$F_m$") computed as discussed supra for the candidate network topology m in each iteration where the optimality function $F_0$ for the optimal network topology is associated with the specified network topology, the loss function (L) is computed, in one embodiment, in each iteration via Equations (4)-(5).

$$\mu=\text{argmax}_{m\in(1,\ldots,M)}F_m \quad (4)$$

$$L=(F_0-F_\mu)^t \text{ where } t>0 \quad (5)$$

For t=1, $L=F_0-F_\mu$.
For t=½, $L=(F_0-F_\mu)^{1/2}$.
For t=2, $L=(F_0-F_\mu)^2$.

From Equations (4)-(5), the candidate network topology μ is the optimum network topology that has the highest optimality function value $F_\mu$ as compared with the optimality function value of all other candidate network topologies m≠μ.

Since $F_0$ is the optimal network topology associated with the specified network topology, $F_0-F_\mu \geq 0$ is expected to always be satisfied in each iteration, and $F_0-F_\mu=0$ occurs if the candidate network topology u has the same highest optimality function value as the optimal network topology associated with the specified network topology (e.g., if the optimum network topology u is the optimal network topology associated with the specified network topology).

However, due to an error such as a data error and/or a computing error, an erroneous condition of $F_0-F_\mu<0$ could occur. Thus, in one embodiment, the value of $F_0-F_\mu$ can be monitored and checked to determine whether the erroneous condition of $F_0-F_\mu<0$ has occurred.

In each iteration, there are M output nodes in the output layer 230, wherein output node m is associated with the candidate network topology m, and optimality function value $F_m$ is inserted into output node m (m=1, . . . , M).

In each iteration, the optimum network topology is the candidate network topology m whose optimality function value ($F_m$) is higher than the optimality function value of all other candidate network topologies of the M candidate network topologies.

Step 750 performs back propagation to adjust the weights and biases of the connection nodes in order to minimize the loss function (L) to be computed in the next iteration. In one embodiment the back propagation is performed using gradient descent optimization.

Step 760 determines whether the next iteration is to be performed.

More specifically, step 760 determines that the next iteration is not to be performed (No branch from step 760) if the computed value of the loss function (L) is zero, a change in the loss function (L) from the immediately previous iteration is less than a specified tolerance, or a specified maximum number of iterations has been performed; otherwise (Yes branch from step 760), performance of the next iteration is triggered by looping back to step 720 for computing performance (p), availability (a), and scalability(s) for the candidate network topologies.

Figure 8:
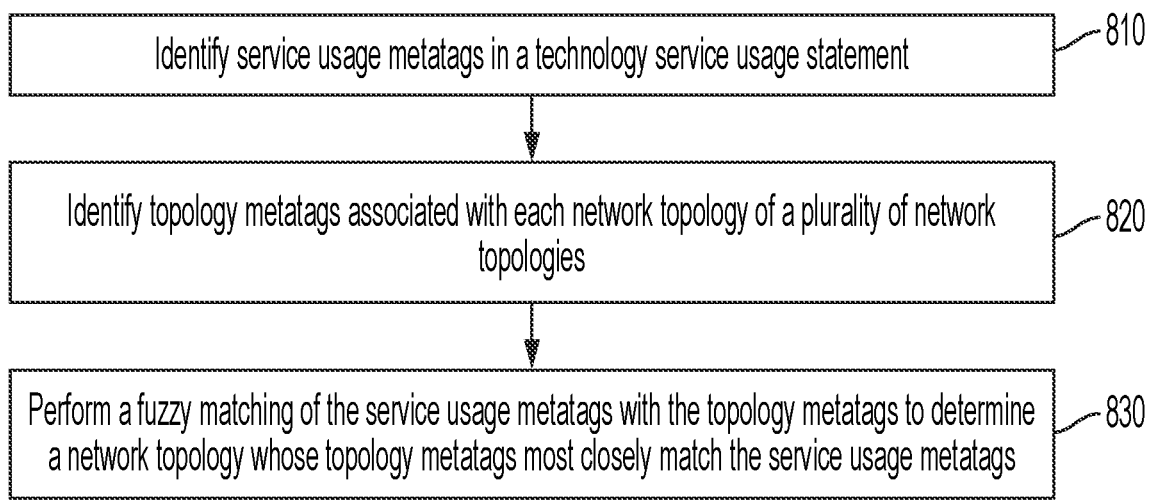
FIG. 8 is a flow chart describing a process for determining a network topology that can be used for executing a qualified GCN model, in accordance with embodiments of the present invention.

FIG. 8 is a flow chart describing a process for determining a network topology that can be used for executing a qualified GCN model, in accordance with embodiments of the present invention. The generated network topology can serve as the input network topology for executing a qualified GCN model via step 370 of FIG. 3.

The flow chart of FIG. 8 includes steps 810-830.

Step 810 identifies service usage metatags in a technology service usage statement, by using existing text/image analytics to extract the service usage metatags from the technology service usage statement (e.g., via comparison of text in the technology service usage statement with a reference list of standard service usage metatags). The service usage metatags are associated with technology services that have been performed. Metatags are nouns that indicate cloud service names, product codes, deployment patterns, and other standard technology nouns.

In one embodiment, the technology service usage statement is a cloud service usage statement.

Table 1 depicts a relevant portion of an exemplary technology service usage statement.

TABLE 1

| Usage Start Date | Usage End Date | Line Item/ Product Code | Line Item/Usage Type |
|---|---|---|---|
| 2023 Jun. 9 | 2023 Jun. 13 | DataTransfer | USE1-EU-Out-Bytes |
| 2023 Jun. 3 | 2023 Jun. 4 | Web Server | USW2-BoxUsage:t2.small |
| 2023 Jun. 1 | 2023 Jun. 2 | DataTransfer | EUC1-DataTransfer:RegBytes |
| 2023 Jun. 4 | 2023 Jun. 6 | DataTransfer | EUC1-USE1-Out-Bytes |
| 2023 Jun. 9 | 2023 Jun. 10 | Web Server | EUC1-E8-0VolumeUsage |
| 2023 Jun. 2 | 2023 Jun. 2 | Route | SAE1-Requests-Tier2 |
| 2023 Jun. 3 | 2023 Jun. 4 | Route | EUC1-TimeStorage-Byte1-trs |
| 2023 Jun. 5 | 2023 Jun. 6 | Web Server | EUW2-SnapshotUsage |
| 2023 Jun. 8 | 2023 Jun. 10 | Web Server | USW1-ElaticIP:IdleAddress |
| 2023 Jun. 10 | 2023 Jun. 12 | Route | USW1-Requests-Tier2 |
| 2023 Jun. 3 | 2023 Jun. 5 | DataTransfer | EUC1-DataTransfer-Out-Bytes |

Illustratively, the following technology service usage metatags are identified from the technology service usage statement in Table 1: SnapshotUsage, VolumeUsage, Route, BoxUsage, Web Server, Data-Transfer-Regional-Byte.

Step 820 identifies network topology metatags associated with each network topology of a plurality of network topologies.

Cloud providers provide several standard network topologies (architectures) depicted in standard network topology diagrams encompassing network topology diagrams that include topology metatags such as, inter alia, service icons/ names. Major cloud providers provide such standard network topology diagrams. In one embodiment, the plurality of network topologies are drawn from such standard network topologies. Thus, step 820 identifies the network topology metatags by using existing text/image analytics to extract the network topology metatags from the standard network topology diagrams (e.g., via comparison of text in the standard network topology diagrams with a reference list of standard topology metatags).

The network topology in each of FIG. 1A, FIG. 1B and FIG. 1C is a standard network topology diagram from which the following topology metatags have been identified and appear in Table 2

TABLE 2

| FIG. 1A: Topology Diagram for VPC Storage Topology | FIG. 1B: Topology Diagram for Cloud Security Topology | FIG. 1C: Topology diagram for VPC Network Tolology |
|---|---|---|
| Topology Metatags: Data Volume Root Volume Snapshots Route Auto Scaling Group Bucket Web Server Instance Elastic Load Balancing | Topology Metatags: Firewall, Server/DB Access control, Security Monitoring, DB Encryption, Anti Virus Server WAS, WAB, WEB | Topology Metatags: Private Subnet Public Subnet Internet Gateway NAT Gateway Elastic IP |

Step 830 performs a fuzzy matching of the service usage metatags with the topology metatags to determine a network topology whose topology metatags most closely match the technology service usage metatags. The fuzzy matching is performed by comparing the topology metatags identified in step 820 with the service usage metatags identified in step 810, using the fuzzy matching to determine which network topology of the plurality of network topologies includes topology metatags identified in step 820 that most closely match the service usage metatags identified in step 810.

Fuzzy matching uses a set of fuzzy rules to identify similar elements in two datasets being compared. The fuzzy rules allow for some degree of similarity, which makes the search process more efficient. The fuzzy matching compares two strings and assigns a score to each string based on how similar the two string are. The closer the two scores are, the more similar the two strings are.

Fuzzy matching techniques that may be used include inter alia: Levenshtein Distance, Damerau-Levenshtein Distance, Jaro-Winkler Distance, Keyboard Distance, Kullback-Leibler Distance, Jaccard Index, Metaphone 3, Name Variant, Syllable Alignment, Acronym, etc.

In one embodiment using the Levenshtein distance, or any of the other techniques, a score between 0 and 1 (inclusive) may be assigned where a score of 1 means that the two datasets match exactly and a score of 0 means that the two datasets match do not match to any extent.

For example, for a query of "financial projections" and a document that includes "financial overview", the fuzzy matching score based on the Levenshtein distance has a score of 1 because the first dataset of "financial" in the query of "financial projections" and the second dataset of "financial" in the document that includes "financial distance" match exactly. On the other hand, a query of "financial projections" and a document that includes "investment planning" only have a score of 0.8 because their Levenshtein distance is 0.8.

A fuzzy match of each of the topology metatags listed in Table 2 for the network topologies of FIGS. 1A, 1B, and 1C with the technology service usage metatags identified in Table 1 results in the network topology in FIG. 1A being the closest matching network topology.

Figure 9:
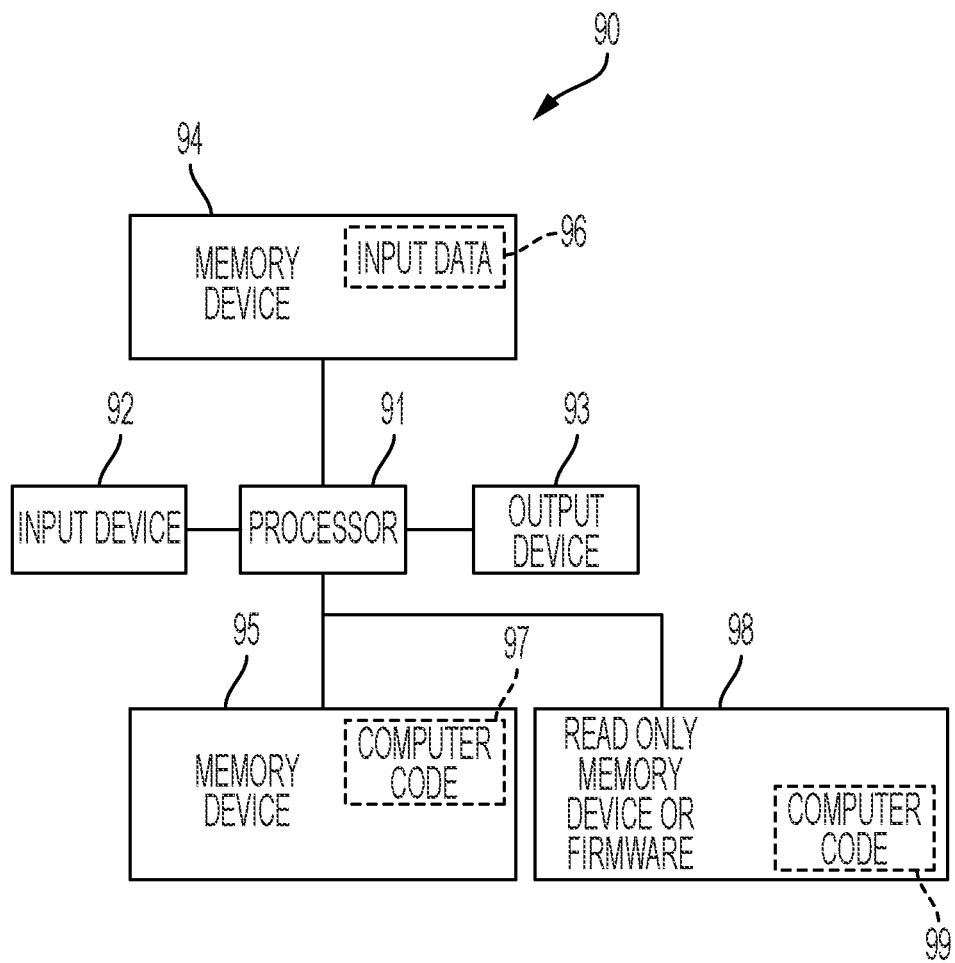
FIG. 9 illustrates a computer system, in accordance with embodiments of the present invention.
Figure 10:
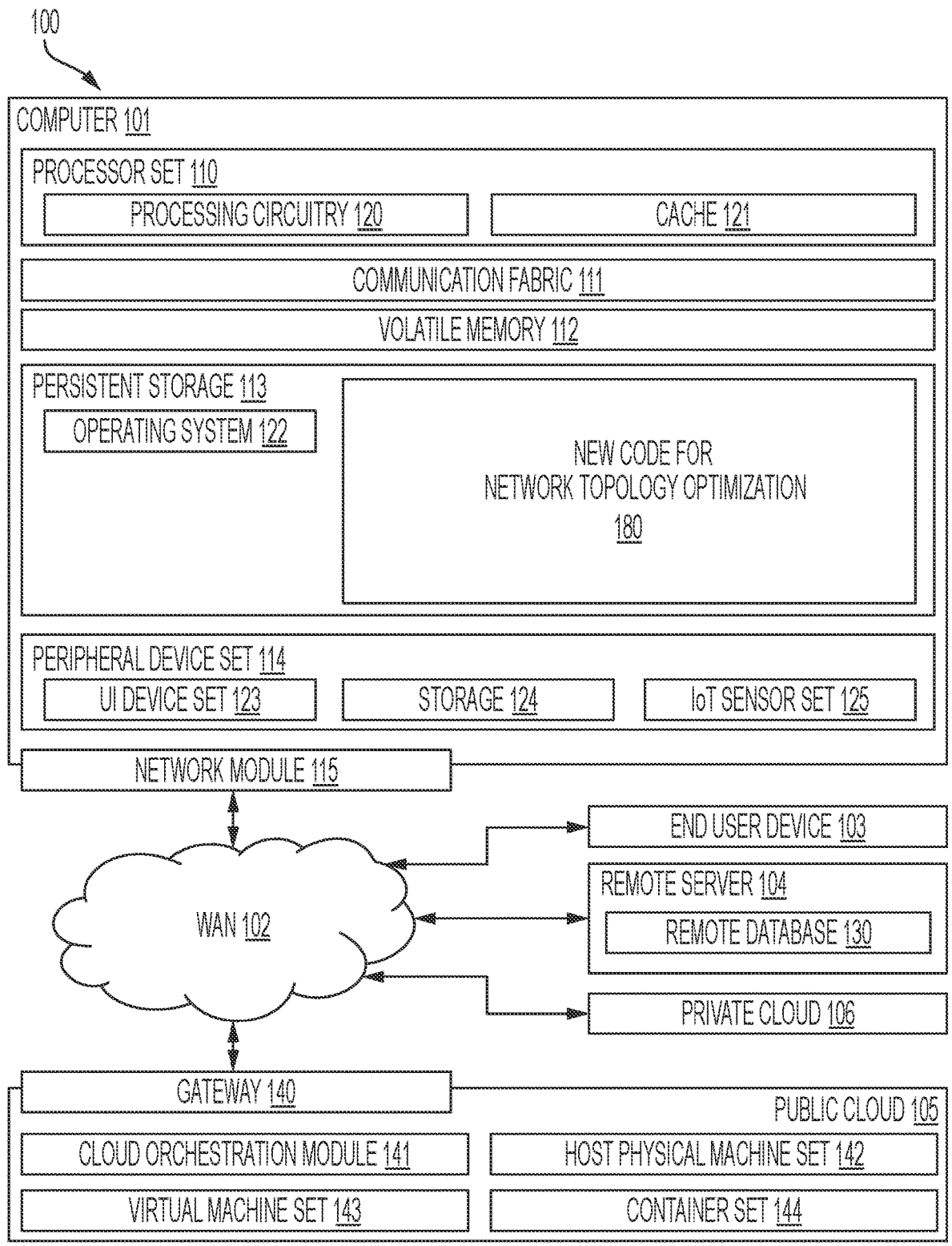
FIG. 10 depicts a computing environment which contains an example of an environment for the execution of at least some of the computer code involved in performing the inventive methods, in accordance with embodiments of the present invention.

FIG. 9 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 9 depicts a computing environment 100 which contains an example of an environment for the execution of at least some of the computer code involved in performing the inventive methods, in accordance with embodiments of the present invention. Such computer code includes new code for network topology optimization 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for network topology optimization, said method comprising:
   training, by one or more processors of a computer system, a graph convolutional network (GCN) model using training network topology datasets as input,
   wherein a collection of network topology datasets comprises the training network topology datasets,
   wherein each network topology dataset in the collection includes: (i) a specified network topology and an associated optimal network topology and an optimality function value for the optimal network topology, (ii) relative weights of optimality parameters including performance (p), availability (a), and scalability(s), and (iii) an identification of an optimality function of the optimality parameters weighted by the relative weights,
   wherein the specified network topology in each network topology dataset comprises components, relationships between the components, and metadata pertaining to the components,
   wherein each output node in an output layer of the GCN model includes an optimality function value of the optimality function for a different candidate network topology selected from the group consisting of an expanded network topology relative to the specified network topology and a contracted network topology relative to the specified network topology, and wherein one of the output nodes identifies an optimum network topology relative to the specified network topology as being the candidate network topology having a highest optimality function value in comparison with the optimality function value in all of the other output nodes.

2. The method of claim 1, wherein the collection of network topology datasets further comprise validation network topology datasets and test network topology datasets, and wherein the method further comprises:

executing, by the one or more processors for a specified input network topology and specified relative weights of the optimality parameters, the GCN that is qualified due to having been trained using the training network topology datasets, validated using the validation network topology datasets, and successfully tested using the test network topology datasets, wherein said executing the qualified GCN populates the output nodes with optimality function values, and wherein the output node having a highest optimality function value is an optimum network topology relative to the specified input network topology.

3. The method of claim 2, wherein each network topology of a plurality of network topologies comprises metatags associated with each network topology's architecture, wherein a technology service usage statement comprises metatags associated with technology services that have been performed, and wherein the specified input network topology is a network topology of the plurality of network topologies whose included metatags are a closest fuzzy match to respective metatags in the technology service usage statement.

4. The method of claim 1, wherein the GCN model includes sequentially: an input layer, hidden layers, and the output layer, wherein the hidden layers include one or more graph convolutional layers comprising convolution nodes, one or more pooling layers comprising pooling nodes, and one or more fully connected layers comprising connection nodes and both weights and biases associated with connection nodes, wherein the output layer is directly connected to the one or more fully connected layers, wherein the input layer comprises input nodes and edges connecting the input nodes of the input layer, wherein for each training network topology dataset: (i) each node of the input layer represent the components and contains features associated with or derived from the metadata and (ii) the edges of the input layer represent the relationships between the components.

5. The method of claim 4, wherein said training comprises for each network topology dataset:

generating the input nodes and edges and populating the input nodes with features derived from the metadata;

propagating features of the input layer into convolutional nodes of the one or more convolutional layers and modifying content of the one or more convolution nodes via passing a message of each convolution node's features to neighboring convolution nodes of said each convolution node and aggregating at each convolution node the messages received from the neighboring convolution nodes of said each convolution node;

passing output from convolution nodes of the one or more convolutional layers to pooling nodes of the one or more pooling layers, followed by grouping the pooling nodes into groups and aggregating the groups; and passing output data from the one or more pooling layers to the one or more fully connected layers;

processing the connection nodes of the one or more fully connected layers to compute an optimality function value of the optimality function for each candidate network topology; and inserting the optimality function values for each candidate network topology in respective output nodes of the output layer.

6. The method of claim 5, wherein said processing the connection nodes comprises initializing the weights and biases of the connection nodes, followed by performing each iteration of an iterative process, wherein said performing each iteration comprises:

computing the performance, availability, and scalability of each candidate network topology, using the weights and biases of the connection nodes;

computing the optimality function values for the candidate network topologies, using the computed performance, availability, and scalability of each candidate network topology;

computing a loss function (L) in dependence on (i) the optimality function values for the candidate network topologies and (ii) the optimality function value for the optimal network topology, wherein $L \geq 0$;

performing back propagation to adjust the weights and biases of the connection nodes to minimize the loss function to be calculated in a next iteration of the iterative process; and determining that the next iteration should not be performed if the computed value of the loss function is zero, a change in the loss function from the immediately previous iteration is less than a specified tolerance, or a specified maximum number of iterations has been performed, otherwise initiating performance of the next iteration by looping back to said computing the performance, availability, and scalability for the candidate network topologies.

7. The method of claim 6, wherein the optimality function for each candidate network topology is a linear function of the performance, availability, and scalability of each candidate network topology.

8. The method of claim 6, wherein the optimality function for each candidate network topology is a non-linear function of the performance, availability, and scalability of each candidate network topology.

9. A computer program product, comprising one or more computer readable hardware storage devices having computer readable program code stored therein, said program code containing instructions executable by one or more processors of a computer system to implement a method for network topology optimization, said method comprising:

training, by the one or more processors, a graph convolutional network (GCN) model using training network topology datasets as input, wherein a collection of network topology datasets comprises the training network topology datasets, wherein each network topology dataset in the collection includes: (i) a specified network topology and an associated optimal network topology and an optimality function value for the optimal network topology, (ii) relative weights of optimality parameters including performance (p), availability (a), and scalability(s), and (iii) an identification of an optimality function of the optimality parameters weighted by the relative weights, wherein the specified network topology in each network topology dataset comprises components, relationships between the components, and metadata pertaining to the components, wherein each output node in an output layer of the GCN model includes an optimality function value of the optimality function for a different candidate network topology selected from the group consisting of an expanded network topology relative to the specified network topology and a contracted network topology relative to the specified network topology, and wherein one of the output nodes identifies an optimum network topology relative to the specified network topology as being the candidate network topology having a highest optimality function value in comparison with the optimality function value in all of the other output nodes.

10. The computer program product of claim 9, wherein the collection of network topology datasets further comprise validation network topology datasets and test network topology datasets, and wherein the method further comprises:

executing, by the one or more processors for a specified input network topology and specified relative weights of the optimality parameters, the GCN that is qualified due to having been trained using the training network topology datasets, validated using the validation network topology datasets, and successfully tested using the test network topology datasets, wherein said executing the qualified GCN populates the output nodes with optimality function values, and wherein the output node having a highest optimality function value is an optimum network topology relative to the specified input network topology.

11. The computer program product of claim 3, wherein each network topology of a plurality of network topologies comprises metatags associated with each network topology's architecture, wherein a technology service usage statement comprises metatags associated with technology services that have been performed, and wherein the specified input network topology is a network topology of the plurality of network topologies whose included metatags are a closest fuzzy match to respective metatags in the technology service usage statement.

12. The computer program product of claim 9, wherein the GCN model includes sequentially: an input layer, hidden layers, and the output layer, wherein the hidden layers include one or more graph convolutional layers comprising convolution nodes, one or more pooling layers comprising pooling nodes, and one or more fully connected layers comprising connection nodes and both weights and biases associated with connection nodes, wherein the output layer is directly connected to the one or more fully connected layers, wherein the input layer comprises input nodes and edges connecting the input nodes of the input layer, wherein for each training network topology dataset: (i) each node of the input layer represent the components and contains features associated with or derived from the metadata and (ii) the edges of the input layer represent the relationships between the components.

13. The computer program product of claim 12, wherein said training comprises for each network topology dataset:

generating the input nodes and edges and populating the input nodes with features derived from the metadata;

propagating features of the input layer into convolutional nodes of the one or more convolutional layers and modifying content of the one or more convolution nodes via passing a message of each convolution node's features to neighboring convolution nodes of said each convolution node and aggregating at each convolution node the messages received from the neighboring convolution nodes of said each convolution node;

passing output from convolution nodes of the one or more convolutional layers to pooling nodes of the one or more pooling layers, followed by grouping the pooling nodes into groups and aggregating the groups; and passing output data from the one or more pooling layers to the one or more fully connected layers;

processing the connection nodes of the one or more fully connected layers to compute an optimality function value of the optimality function for each candidate network topology; and inserting the optimality function values for each candidate network topology in respective output nodes of the output layer.

14. The computer program product of claim 13, wherein said processing the connection nodes comprises initializing the weights and biases of the connection nodes, followed by performing each iteration of an iterative process, wherein said performing each iteration comprises:

computing the performance, availability, and scalability of each candidate network topology, using the weights and biases of the connection nodes;

computing the optimality function values for the candidate network topologies, using the computed performance, availability, and scalability of each candidate network topology;

computing a loss function (L) in dependence on (i) the optimality function values for the candidate network topologies and (ii) the optimality function value for the optimal network topology, wherein $L \geq 0$;

performing back propagation to adjust the weights and biases of the connection nodes to minimize the loss function to be calculated in a next iteration of the iterative process; and determining that the next iteration should not be performed if the computed value of the loss function is zero, a change in the loss function from the immediately previous iteration is less than a specified tolerance, or a specified maximum number of iterations has been performed, otherwise initiating performance of the next iteration by looping back to said computing the performance, availability, and scalability for the candidate network topologies.

15. A computer system, comprising one or more processors, one or more memories, and one or more computer readable hardware storage devices, said one or more hardware storage devices containing program code executable by the one or more processors via the one or more memories to implement a method for network topology optimization, said method comprising:

training, by the one or more processors, a graph convolutional network (GCN) model using training network topology datasets as input, wherein a collection of network topology datasets comprises the training network topology datasets, wherein each network topology dataset in the collection includes: (i) a specified network topology and an associated optimal network topology and an optimality function value for the optimal network topology, (ii) relative weights of optimality parameters including performance (p), availability (a), and scalability(s), and (iii) an identification of an optimality function of the optimality parameters weighted by the relative weights, wherein the specified network topology in each network topology dataset comprises components, relationships between the components, and metadata pertaining to the components, wherein each output node in an output layer of the GCN model includes an optimality function value of the optimality function for a different candidate network topology selected from the group consisting of an expanded network topology relative to the specified network topology and a contracted network topology relative to the specified network topology, and wherein one of the output nodes identifies an optimum network topology relative to the specified network topology as being the candidate network topology having a highest optimality function value in comparison with the optimality function value in all of the other output nodes.

16. The computer system of claim 15, wherein the collection of network topology datasets further comprise validation network topology datasets and test network topology datasets, and wherein the method further comprises:

executing, by the one or more processors for a specified input network topology and specified relative weights of the optimality parameters, the GCN that is qualified due to having been trained using the training network topology datasets, validated using the validation network topology datasets, and successfully tested using the test network topology datasets, wherein said executing the qualified GCN populates the output nodes with optimality function values, and wherein the output node having a highest optimality function value is an optimum network topology relative to the specified input network topology.

17. The computer system of claim 16, wherein each network topology of a plurality of network topologies comprises metatags associated with each network topology's architecture, wherein a technology service usage statement comprises metatags associated with technology services that have been performed, and wherein the specified input network topology is a network topology of the plurality of network topologies whose included metatags are a closest fuzzy match to respective metatags in the technology service usage statement.

18. The computer system of claim 15, wherein the GCN model includes sequentially: an input layer, hidden layers, and the output layer, wherein the hidden layers include one or more graph convolutional layers comprising convolution nodes, one or more pooling layers comprising pooling nodes, and one or more fully connected layers comprising connection nodes and both weights and biases associated with connection nodes, wherein the output layer is directly connected to the one or more fully connected layers, wherein the input layer comprises input nodes and edges connecting the input nodes of the input layer, wherein for each training network topology dataset: (i) each node of the input layer represent the components and contains features associated with or derived from the metadata and (ii) the edges of the input layer represent the relationships between the components.

19. The computer system of claim 18, wherein said training comprises for each network topology dataset:

generating the input nodes and edges and populating the input nodes with features derived from the metadata;

propagating features of the input layer into convolutional nodes of the one or more convolutional layers and modifying content of the one or more convolution nodes via passing a message of each convolution node's features to neighboring convolution nodes of said each convolution node and aggregating at each convolution node the messages received from the neighboring convolution nodes of said each convolution node;

passing output from convolution nodes of the one or more convolutional layers to pooling nodes of the one or more pooling layers, followed by grouping the pooling nodes into groups and aggregating the groups; and passing output data from the one or more pooling layers to the one or more fully connected layers;

processing the connection nodes of the one or more fully connected layers to compute an optimality function value of the optimality function for each candidate network topology; and inserting the optimality function values for each candidate network topology in respective output nodes of the output layer.

20. The computer system of claim 19, wherein said processing the connection nodes comprises initializing the weights and biases of the connection nodes, followed by performing each iteration of an iterative process, wherein said performing each iteration comprises:

computing the performance, availability, and scalability of each candidate network topology, using the weights and biases of the connection nodes;

computing the optimality function values for the candidate network topologies, using the computed performance, availability, and scalability of each candidate network topology;

computing a loss function (L) in dependence on (i) the optimality function values for the candidate network topologies and (ii) the optimality function value for the optimal network topology, wherein $L \geq 0$;

performing back propagation to adjust the weights and biases of the connection nodes to minimize the loss function to be calculated in a next iteration of the iterative process; and determining that the next iteration should not be performed if the computed value of the loss function is zero, a change in the loss function from the immediately previous iteration is less than a specified tolerance, or a specified maximum number of iterations has been performed, otherwise initiating performance of the next iteration by looping back to said computing the performance, availability, and scalability for the candidate network topologies.

\* \* \* \* \*